US009082045B2

(12) United States Patent
Liu et al.

(10) Patent No.: US 9,082,045 B2
(45) Date of Patent: Jul. 14, 2015

(54) METHOD AND APPARATUS FOR MATCHING KEY PIXELS, AND METHOD AND APPARATUS FOR MATCHING IMAGES

(71) Applicants: PEKING UNIVERSITY FOUNDER GROUP CO., LTD., Beijing (CN); BEIJING FOUNDER APABI TECHNOLOGY LTD., Beijing (CN); PEKING UNIVERSITY, Beijing (CN)

(72) Inventors: Yan Liu, Beijing (CN); Xiaoqing Lv, Beijing (CN); Jianbo Xu, Beijing (CN); Zhi Tang, Beijing (CN)

(73) Assignees: PEKING UNIVERSITY FOUNDER GROUP CO., LTD., Beijing (CN); BEIJING FOUNDER APABI TECHNOLOGY LTD., Beijing (CN); PEKING UNIVERSITY, Beijing (CN)

( * ) Notice: Subject to any disclaimer, the term of this patent is extended or adjusted under 35 U.S.C. 154(b) by 45 days.

(21) Appl. No.: 14/092,587

(22) Filed: Nov. 27, 2013

(65) Prior Publication Data
US 2015/0036933 A1 Feb. 5, 2015

(30) Foreign Application Priority Data
Jul. 31, 2013 (CN) .......................... 2013 1 0329752

(51) Int. Cl.
*G06K 9/48* (2006.01)
*G06K 9/62* (2006.01)
*G06K 9/00* (2006.01)

(52) U.S. Cl.
CPC ............ *G06K 9/6214* (2013.01); *G06K 9/0055* (2013.01); *G06K 9/6215* (2013.01); *G06K 2009/6213* (2013.01)

(58) Field of Classification Search
CPC ........... G06F 17/30247; G06K 9/6232; G06K 2009/6213; G06K 9/6214; G06K 9/6215
USPC ......... 382/197, 195, 190, 181, 254, 278, 224, 382/305
See application file for complete search history.

(56) References Cited

U.S. PATENT DOCUMENTS
2003/0026485 A1* 2/2003 Gotsman et al. .............. 382/224

* cited by examiner

*Primary Examiner* — Mike Rahmjoo
(74) *Attorney, Agent, or Firm* — Workman Nydegger (57) ABSTRACT

A method and apparatus for matching key pixels of images and a method and apparatus for matching images are disclosed. The method for matching key pixels of images includes: determining, for a key pixel to be matched of a first image, a first eigenvector, in a set of eigenvectors of a second image, matching an eigenvector of the key pixel to be matched; determining a second eigenvector, in a set of eigenvectors of the first image, matching the first eigenvector; and determining the key pixel to be matched and a key pixel corresponding to the first eigenvector as a pair of matching pixels when a coordinate vector of the key pixel to be matched is the same as a coordinate vector of a key pixel corresponding to the second eigenvector.

8 Claims, 3 Drawing Sheets

METHOD AND APPARATUS FOR MATCHING KEY PIXELS, AND METHOD AND APPARATUS FOR MATCHING IMAGES

CROSS-REFERENCE TO RELATED APPLICATIONS

The present application claims priority to Chinese Patent Application No. 201310329752.8 filed with the Chinese Patent Office on Jul. 31, 2013 and entitled "method and apparatus for matching key pixels, and method and apparatus for matching images", which is hereby incorporated by reference in its entirety.

FIELD OF THE INVENTION

The present invention relates to the field of digital image processing and particularly to a method and apparatus for matching key pixels of two images and a method and apparatus for matching images.

BACKGROUND OF THE INVENTION

Image matching technologies have been widely applied in the fields of image retrieval, image splicing, target detection and recognition, robot scenario positioning and video contents analysis. Existing matching of images is generally based upon matching key pixels of the images, where it is determined that two images match when a key pixel of one image matches a key pixel of the other image. For example, for two images A and B to be matched, it is determined that the image A matches the image B when a key pixel of the image A has a corresponding matching key pixel in the image B, that is, a key pixel of the image A and a key pixel of the image B are a pair of matching pixels, where there is a consistent physical characteristic in the neighborhoods of the matching pixels.

Each key pixel of an image corresponds to two types of vectors, which are an eigenvector and a coordinate vector, where the eigenvector of the key pixel describes a physical characteristic in the neighborhood of the key pixel, and the coordinate vector of the key pixel describes the position of the key pixel. Thus currently a key pixel of one image has such a corresponding matching key pixel in the other image that is determined primarily based upon the eigenvectors of the key pixels. There are generally three existing methods of matching key pixels of two images based upon eigenvectors of the key pixels, which are a threshold matching method, a nearest neighbor threshold matching method and a nearest neighbor distance ratio matching method.

In the threshold matching method, for an eigenvector of a key pixel to be matched of a first image, an eigenvector, in a set of eigenvectors of a second image, at a distance, below a preset threshold, from the eigenvector of the key pixel to be matched is determined as a matching eigenvector, and the key pixel to be matched and a key pixel corresponding to the determined matching eigenvector are determined as a pair of matching pixels, where the preset threshold ranges from 0 to 1. With this threshold matching method, the matching pixels may be determined at low reliability due to a number of possible eigenvectors satisfying the condition of their distances from the eigenvector of the key pixel to be matched being below the preset threshold.

In the nearest neighbor threshold matching method, for an eigenvector of a key pixel to be matched of a first image, an eigenvector, in a set of eigenvectors of a second image, at the lowest distance from the eigenvector of the key pixel to be matched is determined as a candidate eigenvector, the candidate eigenvector is determined as a matching eigenvector when the distance between the candidate eigenvector and the eigenvector of the key pixel to be matched is below a preset threshold, and the key pixel to be matched and a key pixel corresponding to the determined matching eigenvector are determined as a pair of matching pixels, where the preset threshold ranges from 0 to 1. With the preset threshold, the candidate eigenvector satisfying the condition of the preset threshold is determined as a matching eigenvector, and the key pixel to be matched and a key pixel corresponding to the determined matching eigenvector are determined as a pair of matching pixels, but actually that the matching eigenvector satisfies the condition of the preset threshold is a necessary condition for correct matching of the key pixel to be matched with the key pixel corresponding to the matching eigenvector, so with the nearest neighbor threshold matching method, it has not been verified whether the key pixel to be matched and the key pixel corresponding to the matching eigenvector satisfy a sufficient condition for correct matching, and consequently the matching pixels may be determined at a high error ratio in the nearest neighbor threshold matching method.

In the nearest neighbor distance ratio matching method, for an eigenvector of a key pixel to be matched of a first image, a first eigenvector and a second eigenvector, in a set of eigenvectors of a second image, at the lowest and second lowest distances from the eigenvector of the key pixel to be matched are determined respectively; a first distance between the eigenvector of the key pixel to be matched and the first eigenvector is determined, and the second distance between the eigenvector of the key pixel to be matched and the second eigenvector is determined, and the key pixel to be matched and a key pixel corresponding to the first eigenvector are determined as a pair of matching pixels when the ratio of the first distance to the second distance is below a preset threshold, where the preset threshold ranges from 0 to 1. Similarly to the nearest neighbor threshold matching method, the matching pixels may be determined at a high error ratio in the nearest neighbor distance ratio matching method.

In summary, the matching pixels may be determined at low reliability and a high error ratio in the prior art where the key pixels of the two images are matched based upon the eigenvectors of the key pixels.

SUMMARY OF THE INVENTION

Embodiments of the invention provide a method and apparatus for matching key pixels of two images so as to improve the reliability and accuracy of determined matching pixels.

Embodiments of the invention provide a method and apparatus for matching images so as to improve the reliability and accuracy of the determined matching images.

In a first aspect, an embodiment of the invention provides a method for matching key pixels of two images, including:

determining, for a key pixel to be matched of a first image, a first eigenvector, in a set of eigenvectors of a second image, matching an eigenvector of the key pixel to be matched, wherein the set of eigenvectors of the second image includes eigenvectors of respective key pixels of the second image;

determining a second eigenvector, in a set of eigenvectors of the first image, matching the first eigenvector, wherein the set of eigenvectors of the first image includes eigenvectors of respective key pixels of the first image; and determining the key pixel to be matched and a key pixel corresponding to the first eigenvector as a pair of matching pixels when a coordinate vector of the key pixel to be matched is the same as a coordinate vector of a key pixel corresponding to the second eigenvector.

In the embodiment of the invention, not only a necessary condition for correct matching of key pixels is verified to obtain the first eigenvector matching the eigenvector of the key pixel to be matched (that is, the first eigenvector satisfies the necessary condition), but also a sufficient condition for correct matching of key pixels is verified, that is, the second eigenvector matching the first eigenvector is obtained, and it is further verified whether the coordinate vector of the key pixel to be matched is the same as the coordinate vector of the key pixel corresponding to the second eigenvector (that is, it is verified whether the key pixel to be matched is the same pixel as the key pixel corresponding to the second eigenvector), thereby determining the matching pixels at high reliability and a low error ratio and improving the accuracy of the determined matching pixels.

Preferably the key pixel to be matched and the key pixel corresponding to the first eigenvector are determined not as a pair of matching pixels when the coordinate vector of the key pixel to be matched is not the same as the coordinate vector of the key pixel corresponding to the second eigenvector.

In the embodiment of the invention, for the key pixel corresponding to the first eigenvector satisfying the necessary condition for correct matching of key pixels, it is determined that the key pixel to be matched does not match the key pixel corresponding to the first eigenvector satisfying the necessary condition for correct matching of key pixels when the key pixel corresponding to the second eigenvector matching the first eigenvector and the key pixel to be matched do not satisfy the sufficient condition for correct matching of key pixels, thereby ensuring the key pixel corresponding to the first eigenvector with a high match error ratio as a matching pixel of the key pixel to be matched.

Preferably determining the first eigenvector, in the set of eigenvectors of the second image, matching the eigenvector of the key pixel to be matched includes:

determining the first eigenvector, in the set of eigenvectors of the second image, matching the eigenvector of the key pixel to be matched in a threshold matching method or a nearest neighbor threshold matching method or a nearest neighbor distance ratio matching method; and determining the second eigenvector, in the set of eigenvectors of the first image, matching the first eigenvector includes:

determining the second eigenvector, in the set of eigenvectors of the first image, matching the first eigenvector in the threshold matching method or the nearest neighbor threshold matching method or the nearest neighbor distance ratio matching method.

In the embodiment of the invention, three methods are provided to determine another eigenvector, in a set of eigenvectors of another image, matching one eigenvector of one image so that those skilled in the art can readily practice the technical solution of the invention. It shall be noted that the three particular methods provided in the embodiments of the invention are intended to merely illustrate but not limit the invention, and other methods with which the technical solution of the invention can be practiced will also come into the scope of the invention.

In a second aspect, an embodiment of the invention provides a method for matching images based upon the method for matching key pixels of two images, including:

performing respectively for each of key pixels to be matched of a first image the steps of matching the key pixel to be matched and a key pixel of a second image; and determining that the first image matches the second image if at least one of the key pixels to be matched of the first image has a corresponding matching pixel in the second image; otherwise, determining that the first image does not match the second image.

In the embodiment of the invention, since the matching pixels are determined at high reliably and accuracy, correspondingly the matching images are determined in the embodiment of the invention also at high reliably and accuracy.

Preferably the first image is an image to be matched, and the second image is a dynamically input image.

In the embodiment of the invention, for an application scenario where an image to be matched needs to match a plurality of dynamically input images, the image to be matched can be ensured to match each of the dynamically input images at improved reliably and accuracy in the embodiment of the invention.

In a third aspect, an embodiment of the invention provides an apparatus for matching key pixels of two images, including:

a first determining unit configured to determine, for a key pixel to be matched of a first image, a first eigenvector, in a set of eigenvectors of a second image, matching an eigenvector of the key pixel to be matched, wherein the set of eigenvectors of the second image includes eigenvectors of respective key pixels of the second image;

a second determining unit configured to determine a second eigenvector, in a set of eigenvectors of the first image, matching the first eigenvector, wherein the set of eigenvectors of the first image includes eigenvectors of respective key pixels of the first image; and a processing unit configured to determine the key pixel to be matched and a key pixel corresponding to the first eigenvector as a pair of matching pixels when a coordinate vector of the key pixel to be matched is the same as a coordinate vector of a key pixel corresponding to the second eigenvector.

Preferably the processing unit is further configured to determine the key pixel to be matched and the key pixel corresponding to the first eigenvector not as a pair of matching pixels when the coordinate vector of the key pixel to be matched is not the same as the coordinate vector of the key pixel corresponding to the second eigenvector.

Preferably the first determining unit is further configured to determine the first eigenvector, in the set of eigenvectors of the second image, matching the eigenvector of the key pixel to be matched in a threshold matching method or a nearest neighbor threshold matching method or a nearest neighbor distance ratio matching method; and the second determining unit is further configured to determine the second eigenvector, in the set of eigenvectors of the first image, matching the first eigenvector in the threshold matching method or the nearest neighbor threshold matching method or the nearest neighbor distance ratio matching method.

In a fourth aspect, an embodiment of the invention provides an apparatus for matching images, including:

a matching unit configured to perform respectively for each of key pixels to be matched of a first image: determining a first eigenvector, in a set of eigenvectors of a second image, matching an eigenvector of the key pixel to be matched, determining a second eigenvector, in a set of eigenvectors of the first image, matching the first eigenvector, and determining the key pixel to be matched and a key pixel corresponding to the first eigenvector as a pair of matching pixels when a coordinate vector of the key pixel to be matched is the same as a coordinate vector of a key pixel corresponding to the second eigenvector; and a determining unit configured to determine that the first image matches the second image if at least one of the key pixels to be matched of the first image has a corresponding matching pixel in the second image; otherwise, to determine that the first image does not match the second image, wherein the set of eigenvectors of the first image includes eigenvectors of respective key pixels of the first image, and the set of eigenvectors of the second image includes eigenvectors of respective key pixels of the second image.

Preferably the first image is an image to be matched, and the second image is a dynamically input image.

As compared with the prior art, in the embodiments of the invention, not only a necessary condition for correct matching of key pixels is verified to obtain the first eigenvector matching the eigenvector of the key pixel to be matched (that is, the first eigenvector satisfies the necessary condition), but also a sufficient condition for correct matching of key pixels is verified, that is, the second eigenvector matching the first eigenvector is obtained, and it is further verified whether the coordinate vector of the key pixel to be matched is the same as the coordinate vector of the key pixel corresponding to the second eigenvector (that is, it is verified whether the key pixel to be matched is the same pixel as the key pixel corresponding to the second eigenvector), thereby determining the matching pixels at high reliability and a low error ratio.

DETAILED DESCRIPTION OF THE EMBODIMENTS

In embodiments of the invention, for a key pixel to be matched of a first image, a first eigenvector matching an eigenvector of the key pixel to be matched is determined in a set of eigenvectors of a second image, and a second eigenvector matching the first eigenvector is determined in a set of eigenvectors of the first image, and the key pixel to be matched and a key pixel corresponding to the first eigenvector are determined as a pair of matching pixels when a coordinate vector of the key pixel to be matched is the same as a coordinate vector of a key pixel corresponding to the second eigenvector.

In the embodiments of the invention, not only a necessary condition for correct matching of key pixels is verified to obtain the first eigenvector matching the eigenvector of the key pixel to be matched (that is, the first eigenvector satisfies the necessary condition), but also a sufficient condition for correct matching of key pixels is verified, that is, the second eigenvector matching the first eigenvector is obtained, and it is further verified whether the coordinate vector of the key pixel to be matched is the same as the coordinate vector of the key pixel corresponding to the second eigenvector (that is, it is verified whether the key pixel to be matched is the same pixel as the key pixel corresponding to the second eigenvector), thereby determining the matching pixels at high reliability and a low error ratio.

The embodiments of the invention will be further described below in details with reference to the drawings.

Figure 1:
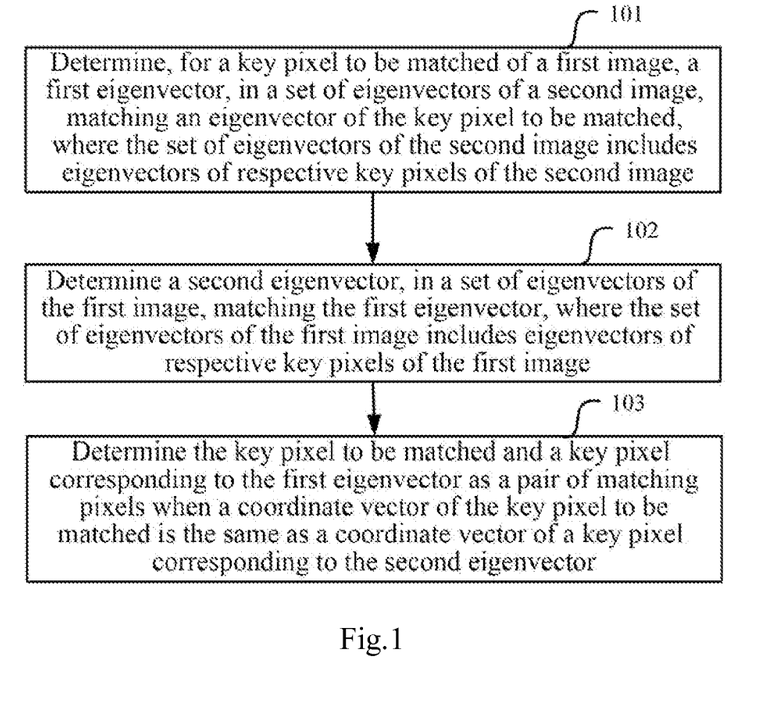
FIG. 1 is a schematic flow chart of a method for matching key pixels of two images according to an embodiment of the invention.

As illustrated in FIG. 1, a method for matching key pixels of two images according to an embodiment of the invention includes the following steps.

The step 101 is to determine, for a key pixel to be matched of a first image, a first eigenvector, in a set of eigenvectors of a second image, matching an eigenvector of the key pixel to be matched, where the set of eigenvectors of the second image includes eigenvectors of respective key pixels of the second image.

The step 102 is to determine a second eigenvector, in a set of eigenvectors of the first image, matching the first eigenvector, where the set of eigenvectors of the first image includes eigenvectors of respective key pixels of the first image.

The step 103 is to determine the key pixel to be matched and a key pixel corresponding to the first eigenvector as a pair of matching pixels when a coordinate vector of the key pixel to be matched is the same as a coordinate vector of a key pixel corresponding to the second eigenvector (that is, when the key pixel to be matched is the same as the key pixel corresponding to the second eigenvector).

Preferably in the step 103, the key pixel to be matched and the key pixel corresponding to the first eigenvector are determined not as a pair of matching pixels when the coordinate vector of the key pixel to be matched is not the same as the coordinate vector of the key pixel corresponding to the second eigenvector (that is, when the key pixel to be matched is not the same as the key pixel corresponding to the second eigenvector).

In an implementation, not only a necessary condition for correct matching of key pixels is verified to obtain the first eigenvector matching the eigenvector of the key pixel to be matched (that is, the first eigenvector satisfies the necessary condition), but also a sufficient condition for correct matching of key pixels is verified, that is, the second eigenvector matching the first eigenvector is obtained, and it is further verified whether the coordinate vector of the key pixel to be matched is the same as the coordinate vector of the key pixel corresponding to the second eigenvector, thereby determining the matching pixels at high reliability and a high accuracy rate.

Preferably in the step 101, the key pixel to be matched of the first image can be any of the key pixels included in the first image or can be at least one key pixel selected from the key pixels included in the first image.

In a particular implementation, the key pixel to be matched can be selected from the key pixels included in the first image as needed or empirically, for example, randomly or in a preset selection algorithm.

Preferably in the step 101, each key pixel to be matched of the first image corresponds to at least one eigenvector, where the step 101 to the step 103 are preformed respectively for each of the eigenvectors of the key pixel to be matched of the first image.

Preferably in the step 101, each of the key pixels of the second image corresponds to at least one eigenvector.

Preferably the number of dimensions of the eigenvector, of the key pixel, representing a physical characteristic in the neighborhood of the key pixel can be preset empirically or as needed.

Preferably in the step 101, the first eigenvector matching the eigenvector of the key pixel to be matched is determined in the set of eigenvectors of the second image in the same implementations as the implementations in the prior art where the first eigenvector matching the eigenvector of the key pixel to be matched is determined in the set of eigenvectors of the second image.

Preferably in the step 101, the first eigenvector matching the eigenvector of the key pixel to be matched is determined in the set of eigenvectors of the second image as follows:

The first eigenvector matching the eigenvector of the key pixel to be matched is determined in the set of eigenvectors of the second image in a threshold matching method or a nearest neighbor threshold matching method or a nearest neighbor distance ratio matching method.

An introduction will be given below respectively of how the first eigenvector matching the eigenvector of the key pixel to be matched is determined in the set of eigenvectors of the second image in a threshold matching method or a nearest neighbor threshold matching method or a nearest neighbor distance ratio matching method in the embodiment of the invention.

First Implementation

Preferably in the step 101, the first eigenvector matching the eigenvector of the key pixel to be matched is determined in the set of eigenvectors of the second image as follows:

Step A1 is to determine eigenvectors, in the set of eigenvectors of the second image, at the lowest and second lowest distances from the eigenvector of the key pixel to be matched respectively;

Step A2 is to determine a first distance between the eigenvector of the key pixel to be matched and the eigenvector at the lowest distance from the eigenvector of the key pixel to be matched and a second distance between the eigenvector of the key pixel to be matched and the eigenvector at the second lowest distance from the eigenvector of the key pixel to be matched; and Step A3 is to determine the eigenvector at the lowest distance from the eigenvector of the key pixel to be matched as the first eigenvector matching the eigenvector of the key pixel to be matched when the ratio of the first distance to the second distance is below a first liminal value.

Preferably in the step A1, the eigenvector at the second lowest distance from the eigenvector of the key pixel to be matched refers to an eigenvector at such a distance from the eigenvector of the key pixel to be matched that is above only the lowest distance.

Figure 4:
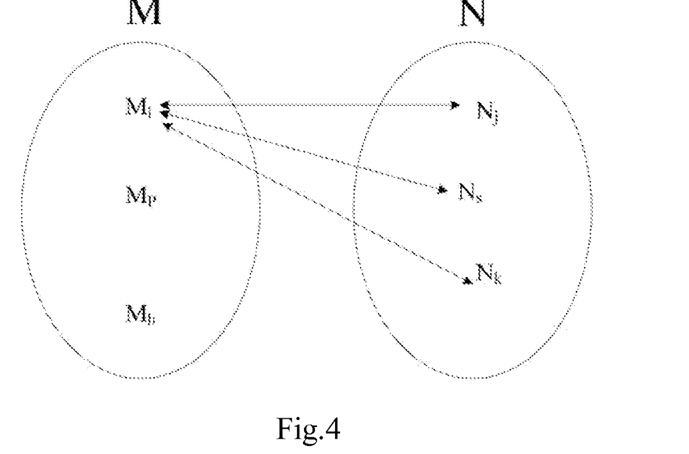
FIG. 4 is a schematic diagram of a first image and a second image according to an embodiment of the invention.

As illustrated in FIG. 4, for example, the first image is an image M, and the second image is an image N, where $M_i$, $M_p$ and $M_h$ are key pixels included in the first image, and $N_j$, $N_s$ and $N_k$ are key pixels included in the second image.

If the eigenvector of the key pixel to be matched is an eigenvector $M_{iT}$ of the key pixel $M_i$, and there are a distance A between an eigenvector $N_{jT}$ of the key pixel $N_j$ and $M_{iT}$, a distance B between an eigenvector $N_{sT}$ of the key pixel $N_s$ and $M_{iT}$, and a distance C between an eigenvector $N_{kT}$ of the key pixel $N_k$ and $M_{iT}$, where A<C<B.

Then the eigenvector $N_{jT}$ is an eigenvector at the lowest distance from the eigenvector of the key pixel to be matched, and the eigenvector $N_{kT}$ is an eigenvector at the second lowest distance from the eigenvector of the key pixel to be matched.

Preferably in the step A2, the first distance and the second distance are Euclidean distances.

Preferably in the step A3, the first liminal value can be preset empirically or as needed.

Preferably the first liminal value ranges from 0.3 to 0.8.

Second Implementation

Preferably in the step 101, the first eigenvector matching the eigenvector of the key pixel to be matched is determined in the set of eigenvectors of the second image as follows:

Step B1 is to determine an eigenvector, in the set of eigenvectors of the second image, at the lowest distance from the eigenvector of the key pixel to be matched;

Step B2 is to determine a fifth distance between the eigenvector of the key pixel to be matched and the eigenvector at the lowest distance from the eigenvector of the key pixel to be matched; and Step B3 is to determine the eigenvector at the lowest distance from the eigenvector of the key pixel to be matched as the first eigenvector matching the eigenvector of the key pixel to be matched when the fifth distance is below a second liminal value.

In a particular implementation, the second liminal value can be set empirically or as needed, and preferably the second liminal value ranges from 0 to 1.

Third Implementation

Preferably in the step 101, the first eigenvector matching the eigenvector of the key pixel to be matched is determined in the set of eigenvectors of the second image as follows:

Step C1 is to determine an eigenvector, in the set of eigenvectors of the second image, at a distance, below a third liminal value, from the eigenvector of the key pixel to be matched; and Step C2 is to take the determined eigenvector at a distance, below the third liminal value, from the eigenvector of the key pixel to be matched as the first eigenvector matching the eigenvector of the key pixel to be matched.

In a particular implementation, the third liminal value can be set empirically or as needed, and preferably the third liminal value ranges from 0 to 1.

Preferably in the step 102, the second eigenvector matching the first eigenvector is determined in the set of eigenvectors of the first image in the similar implementations as the implementations in the prior art where the second eigenvector matching the first eigenvector is determined in the set of eigenvectors of the first image.

Preferably in the step 102, the second eigenvector matching the first eigenvector is determined in the set of eigenvectors of the first image as follows:

The second eigenvector matching the first eigenvector is determined in the set of eigenvectors of the first image in a threshold matching method or a nearest neighbor threshold matching method or a nearest neighbor distance ratio matching method.

An introduction will be given below respectively of how the second eigenvector matching the first eigenvector is determined in the set of eigenvectors of the first image in a threshold matching method or a nearest neighbor threshold matching method or a nearest neighbor distance ratio matching method in the embodiment of the invention.

First Example

Preferably in the step 102, the second eigenvector matching the first eigenvector is determined in the set of eigenvectors of the first image as follows:

Step D1 is to determine eigenvectors, in the set of eigenvectors of the first image, at the lowest and second lowest distances from the first eigenvector respectively;

Preferably an implementation of the step D1 is similar to the implementation of the step A1, and a repeated description thereof will be omitted here.

Step D2 is to determine a third distance between the first eigenvector and the eigenvector at the lowest distance from the first eigenvector and a fourth distance between the first eigenvector and the eigenvector at the second lowest distance from the first eigenvector;

Preferably an implementation of the step D2 is similar to the implementation of the step A2, and a repeated description thereof will be omitted here.

Step D3 is to determine the eigenvector at the lowest distance from the first eigenvector as the second eigenvector matching the first eigenvector when the ratio of the third distance to the fourth distance is below a first threshold.

Preferably the first threshold in the step D3 can be preset empirically or as needed, and the first threshold ranges from 0.3 to 0.8.

In a particular implementation, the first threshold in the step D3 can be above or below or equal to the first liminal value in the step A3.

Preferably the first threshold in the step D3 can be below the first liminal value in the step A3.

In an implementation, the first threshold being below the first liminal value can improve the precision of reverse matching (determining the second eigenvector matching the first eigenvector).

In a particular implementation, the number of key pixels of the second image matching the key pixel to be matched of the first image will be lower with the lower first liminal value and first threshold.

Second Example

Preferably in the step 102, the second eigenvector matching the first eigenvector is determined in the set of eigenvectors of the first image as follows:

Step E1 is to determine an eigenvector, in the set of eigenvectors of the first image, at the lowest distance from the first eigenvector;

Step E2 is to determine a sixth distance between the first eigenvector and the eigenvector at the lowest distance from the first eigenvector; and Step E3 is to determine the eigenvector at the lowest distance from the first eigenvector as the second eigenvector matching the first eigenvector when the sixth distance is below a second threshold.

In a particular implementation, the second threshold can be set empirically or as needed, and preferably the second threshold ranges from 0 to 1.

Third Example

Preferably in the step 102, the second eigenvector matching the first eigenvector is determined in the set of eigenvectors of the first image as follows:

Step F1 is to determine an eigenvector, in the set of eigenvectors of the first image, at a distance, below a third threshold, from the first eigenvector; and Step F2 is to take the determined eigenvector at a distance, below the third threshold, from the first eigenvector as the second eigenvector matching the first eigenvector.

In a particular implementation, the third threshold can be set empirically or as needed, and preferably the third threshold ranges from 0 to 1.

In a particular implementation, the first implementation can be practiced in combination with the first example or the second example or the third example; and the second implementation and the third implementation are practiced as the first implementation.

Preferably the first implementation is practiced in combination with the first example, the second implementation is practiced in combination with the second example, and the third implementation is practiced in combination with the third example.

Preferably in the step 103, the coordinate vector of the key pixel is a 1*3-dimension (i.e., x and y coordinates of the key pixel and the scale of the key pixel) vector to represent the position of the key pixel.

It shall be noted that the method for matching key pixels of two images according to the embodiment of the invention can also be applicable to matching elements between two data sets.

Figure 2:
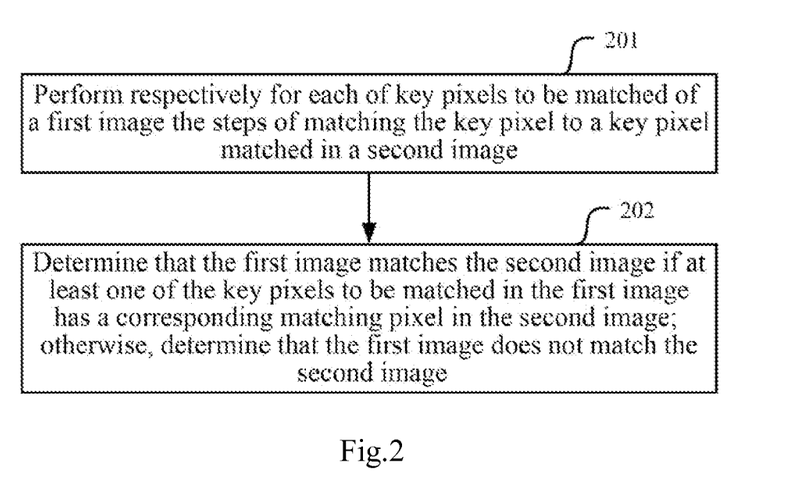
FIG. 2 is a schematic flow chart of a method for matching images according to an embodiment of the invention.

As illustrated in FIG. 2, a method for matching images according to an embodiment of the invention based upon the method for matching key pixels of two images includes the following steps.

Step 201 is to perform respectively for each of key pixels to be matched of a first image the steps of matching the key pixel to be matched and a key pixel of a second image.

Step 202 is to determine that the first image matches the second image if at least one of the key pixels to be matched of the first image has a corresponding matching pixel in the second image; otherwise, to determine that the first image does not match the second image.

Preferably in the step 201, the step of matching the key pixel to be matched and the key pixel of the second image includes the step 101 to the step 103.

Preferably the first image is an image to be matched, and the second image can be a static image or a dynamically input image.

The method for matching images according to the embodiment of the invention will be further described below in details with reference to FIG. 4.

As illustrated in FIG. 4, the first image is an image M, and the second image is an image N, where $M_i$, $M_p$ and $M_h$ are key pixels included in the first image, and $N_j$, $N_s$ and $N_k$ are key pixels included in the second image.

It is assumed that key pixels to be matched of the image M are $M_i$, $M_p$ and $M_h$, and an eigenvector of the key pixel $M_i$ is $M_{iT}$, an eigenvector of the key pixel $M_p$ is $M_{pT}$, and an eigenvector of the key pixel $M_h$ is $M_{hT}$, and an eigenvector of the key pixel $N_j$ is $N_{jT}$, an eigenvector of the key pixel $N_s$ is $N_{sT}$, and an eigenvector of the key pixel $N_k$ is $N_{kT}$.

A set of eigenvectors of the image M includes $M_{iT}$, $M_{pT}$ and $M_{hT}$, and a set of eigenvectors of the image N includes $N_{jT}$, $N_{sT}$ and $N_{kT}$.

Figure 3:
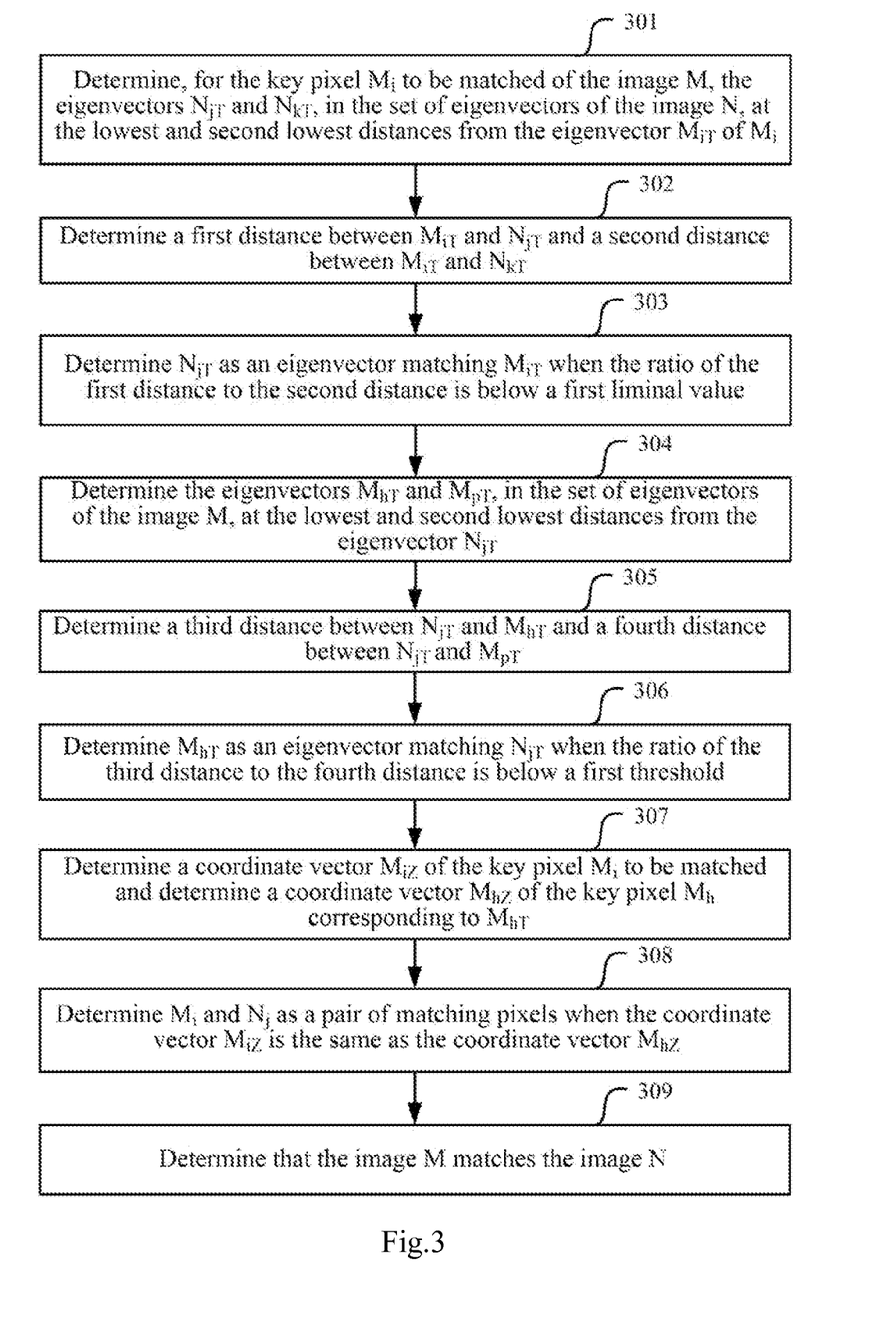
FIG. 3 is a detailed flow chart of a method for matching images according to an embodiment of the invention.

As illustrated in FIG. 3, a detailed method for matching images according to an embodiment of the invention includes the following steps.

Step 301 is to determine, for the key pixel $M_i$ to be matched of the image M, the eigenvectors $N_{jT}$ and $N_{kT}$, in the set of eigenvectors of the image N, at the lowest and second lowest distances from the eigenvector $M_{iT}$ of $M_i$.

Step 302 is to determine a first distance between $M_{iT}$ and $N_{jT}$ and a second distance between $M_{iT}$ and $N_{kT}$.

Step 303 is to determine $N_{jT}$ as an eigenvector matching $M_{iT}$ when the ratio of the first distance to the second distance is below a first liminal value.

Step 304 is to determine the eigenvectors $M_{hT}$ and $M_{pT}$, in the set of eigenvectors of the image M, at the lowest and second lowest distances from the eigenvector $N_{jT}$.

Step 305 is to determine a third distance between $N_{jT}$ and $M_{hT}$ and a fourth distance between $N_{jT}$ and $M_{pT}$.

Step 306 is to determine $M_{hT}$ as an eigenvector matching $N_{jT}$ when the ratio of the third distance to the fourth distance is below a first threshold.

Step 307 is to determine a coordinate vector $M_{iZ}$ of the key pixel $M_i$ to be matched and to determine a coordinate vector $M_{hZ}$ of the key pixel $M_h$ corresponding to $M_{hT}$.

Step 308 is to determine $M_i$ and $N_j$ as a pair of matching pixels when the coordinate vector $M_{iZ}$ is the same as the coordinate vector $M_{hZ}$.

Step 309 is to determine that the image M matches the image N.

Based upon the same inventive idea, an embodiment of the invention further provide an apparatus for matching key pixels of two images and an apparatus for matching images, and since these apparatuses address the problem under a similar principal to the methods according to the embodiments of the invention, reference can be made to the implementations of the methods for implementations of these apparatuses, and a repeated description thereof will be omitted here.

Figure 5:
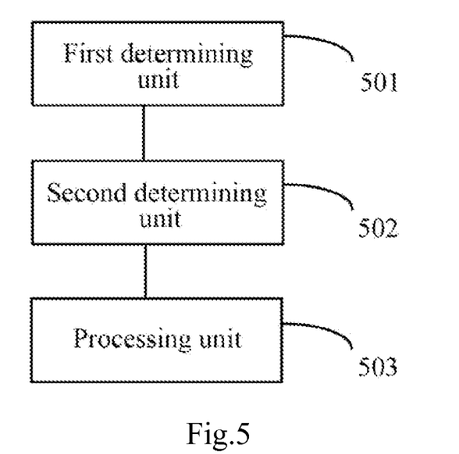
FIG. 5 is a schematic structural diagram of an apparatus for matching key pixels of two images according to an embodiment of the invention.

FIG. 5 illustrates an apparatus for matching key pixels of two images, and as illustrated, the apparatus for matching key pixels of two images according to the embodiment of the invention includes:

A first determining unit 501 configured to determine, for a key pixel to be matched of a first image, a first eigenvector, in a set of eigenvectors of a second image, matching an eigenvector of the key pixel to be matched, where the set of eigenvectors of the second image includes eigenvectors of respective key pixels of the second image;

A second determining unit 502 configured to determine a second eigenvector, in a set of eigenvectors of the first image, matching the first eigenvector, where the set of eigenvectors of the first image includes eigenvectors of respective key pixels of the first image; and A processing unit 503 configured to determine the key pixel to be matched and a key pixel corresponding to the first eigenvector as a pair of matching pixels when a coordinate vector of the key pixel to be matched is the same as a coordinate vector of a key pixel corresponding to the second eigenvector.

Preferably the processing unit 503 is further configured to determine the key pixel to be matched and the key pixel corresponding to the first eigenvector not as a pair of matching pixels when the coordinate vector of the key pixel to be matched is not the same as the coordinate vector of the key pixel corresponding to the second eigenvector.

Preferably the first determining unit 501 is further configured to determine the first eigenvector, in the set of eigenvectors of the second image, matching the eigenvector of the key pixel to be matched in a threshold matching method or a nearest neighbor threshold matching method or a nearest neighbor distance ratio matching method.

The second determining unit 502 is further configured to determine the second eigenvector, in the set of eigenvectors of the first image, matching the first eigenvector in a threshold matching method or a nearest neighbor threshold matching method or a nearest neighbor distance ratio matching method.

Figure 6:
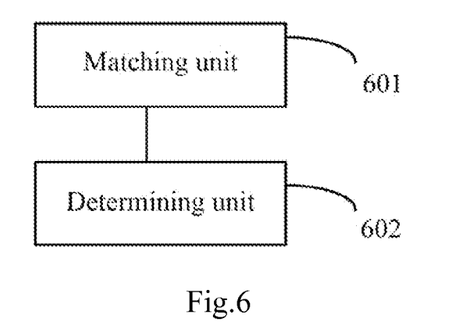
FIG. 6 is a schematic structural diagram of an apparatus for matching images according to an embodiment of the invention.

FIG. 6 is a schematic structural diagram of an apparatus for matching images according to an embodiment of the invention, and as illustrated, the apparatus for matching images according to the embodiment of the invention includes:

A matching unit 601 configured to perform respectively for each of key pixels to be matched of a first image: determining a first eigenvector, in a set of eigenvectors of a second image, matching an eigenvector of the key pixel to be matched, determining a second eigenvector, in a set of eigenvectors of the first image, matching the first eigenvector, and determining the key pixel to be matched and a key pixel corresponding to the first eigenvector as a pair of matching pixels when a coordinate vector of the key pixel to be matched is the same as a coordinate vector of a key pixel corresponding to the second eigenvector; and A determining unit 602 configured to determine that the first image matches the second image if at least one of the key pixels to be matched of the first image has a corresponding matching pixel in the second image; otherwise, to determine that the first image does not match the second image, Where the set of eigenvectors of the first image includes eigenvectors of respective key pixels of the first image, and the set of eigenvectors of the second image includes eigenvectors of respective key pixels of the second image.

Preferably the first image is an image to be matched, and the second image is a dynamically input image.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for matching key pixels of two images, comprising:
   determining, for a key pixel to be matched of a first image, a first eigenvector, in a set of eigenvectors of a second image, matching an eigenvector of the key pixel to be matched, wherein the set of eigenvectors of the second image includes eigenvectors of respective key pixels of the second image;
   determining a second eigenvector, in a set of eigenvectors of the first image, matching the first eigenvector, wherein the set of eigenvectors of the first image includes eigenvectors of respective key pixels of the first image; and
   determining the key pixel to be matched and a key pixel corresponding to the first eigenvector as a pair of matching pixels when a coordinate vector of the key pixel to be matched is the same as a coordinate vector of a key pixel corresponding to the second eigenvector;
   wherein the key pixel to be matched and the key pixel corresponding to the first eigenvector are determined not as a pair of matching pixels when the coordinate vector of the key pixel to be matched is not the same as the coordinate vector of the key pixel corresponding to the second eigenvector.

2. The method according to claim 1, wherein determining the first eigenvector, in the set of eigenvectors of the second image, matching the eigenvector of the key pixel to be matched comprises:
   determining the first eigenvector, in the set of eigenvectors of the second image, matching the eigenvector of the key pixel to be matched in a threshold matching method or a nearest neighbor threshold matching method or a nearest neighbor distance ratio matching method; and
   determining the second eigenvector, in the set of eigenvectors of the first image, matching the first eigenvector comprises:
   determining the second eigenvector, in the set of eigenvectors of the first image, matching the first eigenvector in the threshold matching method or the nearest neighbor threshold matching method or the nearest neighbor distance ratio matching method.

3. The method according to claim 1, wherein determining the first eigenvector, in the set of eigenvectors of the second image, matching the eigenvector of the key pixel to be matched comprises:
   determining the first eigenvector, in the set of eigenvectors of the second image, matching the eigenvector of the key pixel to be matched in a threshold matching method or a nearest neighbor threshold matching method or a nearest neighbor distance ratio matching method; and
   determining the second eigenvector, in the set of eigenvectors of the first image, matching the first eigenvector comprises:
   determining the second eigenvector, in the set of eigenvectors of the first image, matching the first eigenvector in the threshold matching method or the nearest neighbor threshold matching method or the nearest neighbor distance ratio matching method.

4. A method for matching images based upon the method for matching key pixels of two images according to claim 1, comprising:
   performing respectively for each of key pixels to be matched of a first image the steps of matching the key pixel to be matched and a key pixel of a second image; and
   determining that the first image matches the second image if at least one of the key pixels to be matched of the first image has a corresponding matching pixel in the second image; otherwise, determining that the first image does not match the second image.

5. The method according to claim 4, wherein the first image is an image to be matched, and the second image is a dynamically input image.

6. An apparatus for matching key pixels of two images, comprising:
   a first determining unit configured to determine, for a key pixel to be matched of a first image, a first eigenvector, in a set of eigenvectors of a second image, matching an eigenvector of the key pixel to be matched, wherein the set of eigenvectors of the second image includes eigenvectors of respective key pixels of the second image;
   a second determining unit configured to determine a second eigenvector, in a set of eigenvectors of the first image, matching the first eigenvector, wherein the set of eigenvectors of the first image includes eigenvectors of respective key pixels of the first image; and
   a processing unit configured to determine the key pixel to be matched and a key pixel corresponding to the first eigenvector as a pair of matching pixels when a coordinate vector of the key pixel to be matched is the same as a coordinate vector of a key pixel corresponding to the second eigenvector;
   wherein the processing unit is further configured to determine the key pixel to be matched and the key pixel corresponding to the first eigenvector not as a pair of matching pixels when the coordinate vector of the key pixel to be matched is not the same as the coordinate vector of the key pixel corresponding to the second eigenvector.

7. The apparatus according to claim 6, wherein the first determining unit is further configured to determine the first eigenvector, in the set of eigenvectors of the second image, matching the eigenvector of the key pixel to be matched in a threshold matching method or a nearest neighbor threshold matching method or a nearest neighbor distance ratio matching method; and
   the second determining unit is further configured to determine the second eigenvector, in the set of eigenvectors of the first image, matching the first eigenvector in the threshold matching method or the nearest neighbor threshold matching method or the nearest neighbor distance ratio matching method.

8. The apparatus according to claim 6, wherein the first determining unit is further configured to determine the first eigenvector, in the set of eigenvectors of the second image, matching the eigenvector of the key pixel to be matched in a threshold matching method or a nearest neighbor threshold matching method or a nearest neighbor distance ratio matching method; and
   the second determining unit is further configured to determine the second eigenvector, in the set of eigenvectors of the first image, matching the first eigenvector in the threshold matching method or the nearest neighbor threshold matching method or the nearest neighbor distance ratio matching method.

* * * * *